(12) United States Patent
Barrow

(10) Patent No.: US 11,092,180 B2
(45) Date of Patent: Aug. 17, 2021

(54) LOCKING DOWEL ASSEMBLY

(71) Applicant: Carl Barrow, Newport, CA (US)

(72) Inventor: Carl Barrow, Newport, CA (US)

( * ) Notice: Subject to any disclaimer, the term of this patent is extended or adjusted under 35 U.S.C. 154(b) by 601 days.

(21) Appl. No.: 15/978,740

(22) Filed: May 14, 2018

(65) Prior Publication Data

US 2019/0345966 A1 Nov. 14, 2019

(51) Int. Cl.
| F16B 13/08 | (2006.01) |
| F16B 17/00 | (2006.01) |
| F16B 12/24 | (2006.01) |
| F16B 12/10 | (2006.01) |
| F16B 5/00 | (2006.01) |
| E04B 1/48 | (2006.01) |
| F16B 13/12 | (2006.01) |

(52) U.S. Cl.
CPC .............. *F16B 13/08* (2013.01); *F16B 12/24* (2013.01); *F16B 17/00* (2013.01); *E04B 1/48* (2013.01); *F16B 5/0024* (2013.01); *F16B 13/126* (2013.01); *F16B 2012/103* (2013.01)

(58) Field of Classification Search
CPC ...... F16B 13/08; F16B 13/126; F16B 5/0084; F16B 5/0088; F16B 12/20; F16B 12/24; F16B 12/26; F16B 12/36; F16B 12/38; F16B 12/126; F16B 2012/103; F16B 21/082; F16B 21/084; F16B 21/086
USPC ....................................................... 411/385
See application file for complete search history.

(56) References Cited

U.S. PATENT DOCUMENTS

| 1,743,492 | A | | 1/1930 | Sipe | |
| 2,197,786 | A | | 4/1940 | Capouch | |
| 2,650,476 | A | | 9/1953 | Crockett | |
| 3,685,783 | A | | 8/1972 | Hilson | |
| 3,791,750 | A | | 2/1974 | Cameron | |
| D282,237 | S | | 1/1986 | Warburg | |
| 4,984,945 | A | | 1/1991 | Bergner | |
| D459,205 | S | | 6/2002 | Shaw | |
| 8,342,771 | B2 | * | 1/2013 | Goad | ............... E04F 11/1808 403/292 |
| 8,444,359 | B2 | * | 5/2013 | Grether | ............... F16B 35/041 411/385 |
| 9,249,577 | B2 | * | 2/2016 | Ross | ...................... F16G 11/12 |
| 9,404,521 | B2 | * | 8/2016 | Toosky | ............ F16B 19/1045 |
| 9,714,673 | B2 | * | 7/2017 | Phillips | ................. F16B 12/24 |
| 9,968,212 | B1 | * | 5/2018 | Lundmark | ............... F16B 2/04 |

(Continued)

FOREIGN PATENT DOCUMENTS

| KR | 100443594 B1 * 7/2004 |
| KR | 20060109592 A * 10/2006 |
| KR | 20110008514 A * 1/2011 |

(Continued)

*Primary Examiner* — Amber R Anderson
*Assistant Examiner* — Zachary A Hall

(57) ABSTRACT

A locking dowel assembly for joining wooden objects without glue or screws includes a pair of cups. Each of the cups is inserted into a well in a respective pair of objects intended for joining together. A pair of inserts is provided and each of the inserts is positioned against each other such that the pair of inserts forms a cylinder. The cylinder is inserted into each of the cups for joining the objects together. A retainer is positioned between each of the inserts and the retainer has a plurality of teeth thereon. The teeth engage the cups when the insert is inserted into each of the cups thereby retaining the inserts in the cups.

15 Claims, 3 Drawing Sheets

(56) References Cited

U.S. PATENT DOCUMENTS

2006/0228170 A1* 10/2006 Joo ..................... E04C 5/165
                                                                                       403/286
2018/0051464 A1* 2/2018 Griggs .................... E04C 5/165

FOREIGN PATENT DOCUMENTS

| | | | | |
|---|---|---|---|---|
| KR | 101161357 B1 | * | 7/2012 | |
| KR | 20170120993 A | * | 11/2017 | |
| KR | 20180047130 A | * | 5/2018 | |
| WO | WO2012160274 | | 11/2012 | |
| WO | WO-2016006904 A1 | * | 1/2016 | ............. E04C 5/165 |

* cited by examiner

LOCKING DOWEL ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to dowel devices and more particularly pertains to a new dowel device for joining wooden objects without glue or screws.

BRIEF SUMMARY OF THE INVENTION

An embodiment of the disclosure meets the needs presented above by generally comprising a pair of cups. Each of the cups is inserted into a well in a respective pair of objects intended for joining together. A pair of inserts is provided and each of the inserts is positioned against each other such that the pair of inserts forms a cylinder. The cylinder is inserted into each of the cups for joining the objects together. A retainer is positioned between each of the inserts and the retainer has a plurality of teeth thereon. The teeth engage the cups when the insert is inserted into each of the cups thereby retaining the inserts in the cups.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
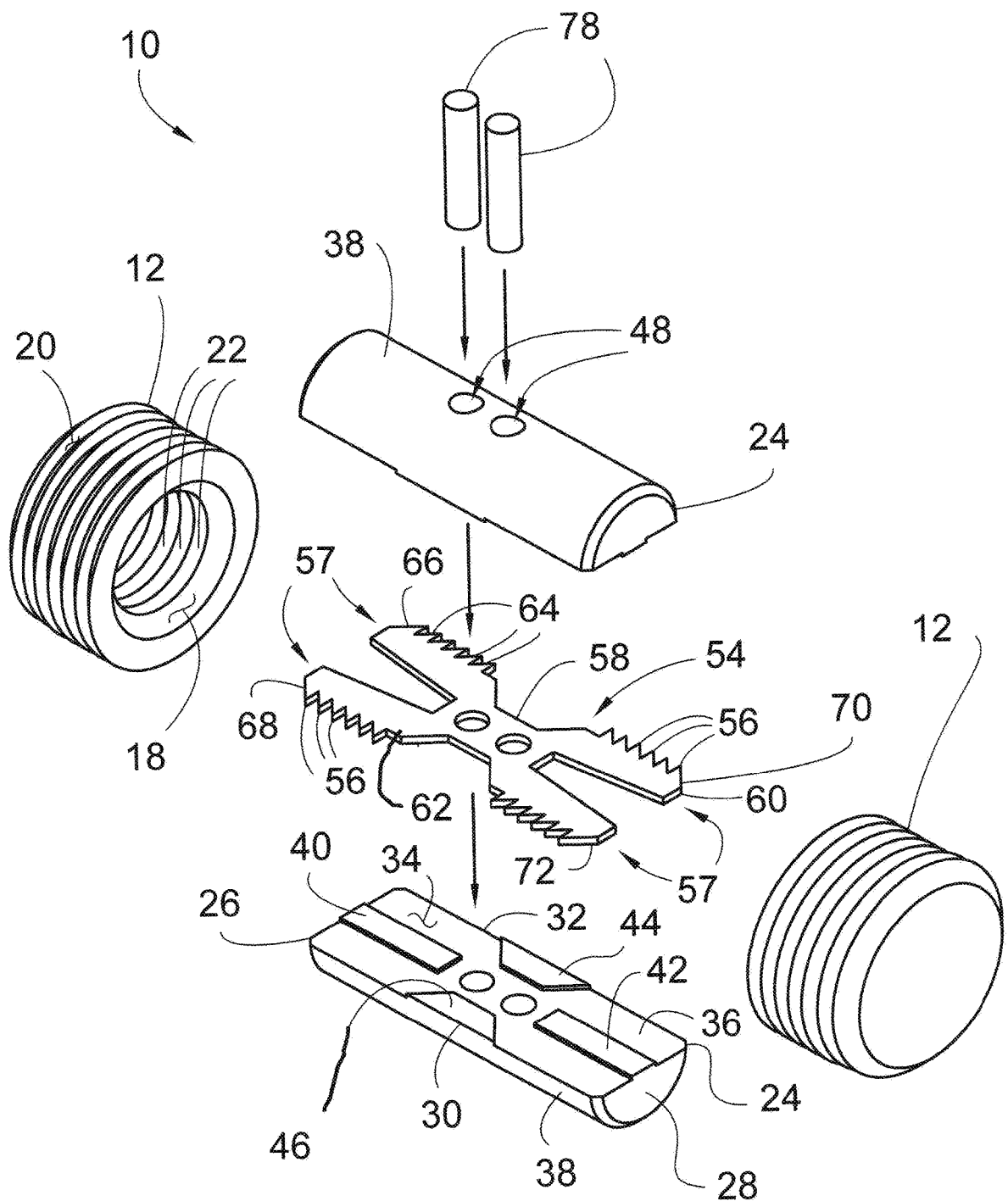
FIG. 1 is an exploded perspective view of a locking dowel assembly according to an embodiment of the disclosure.
Figure 2:
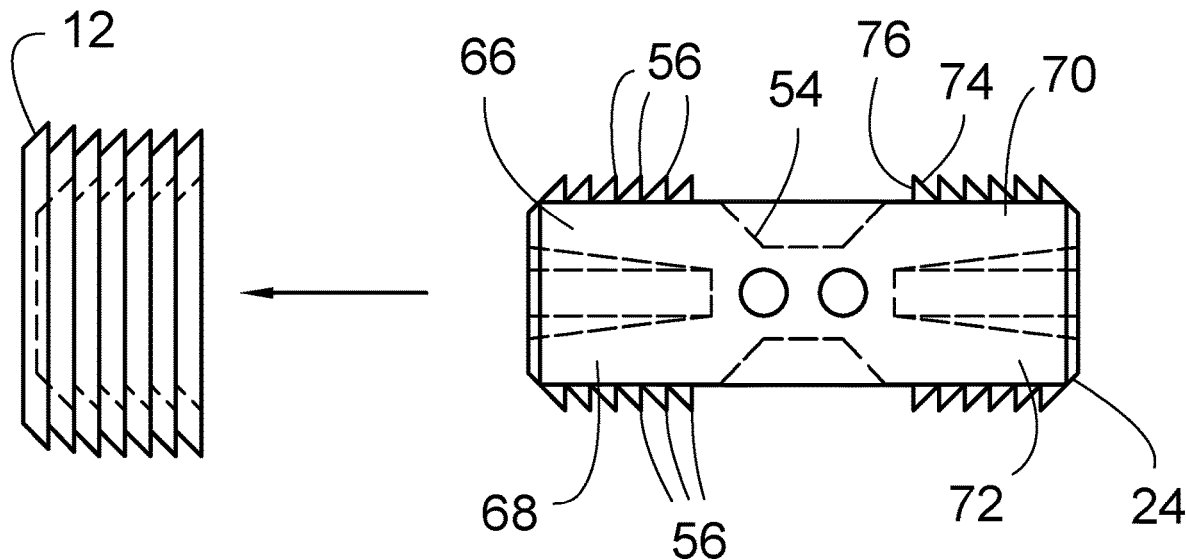
FIG. 2 is a top phantom view of an embodiment of the disclosure.
Figure 3:
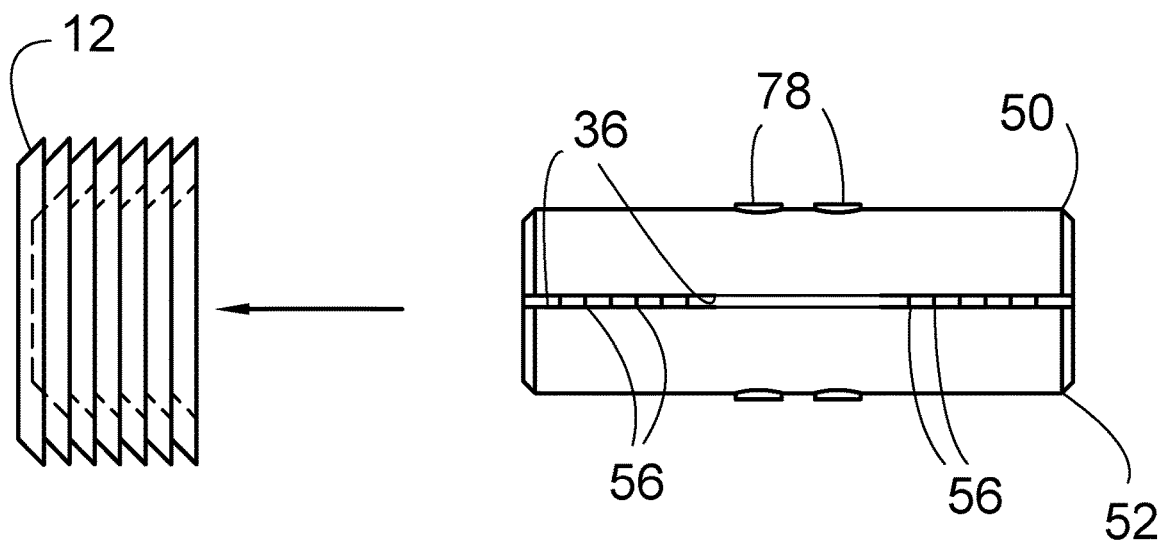
FIG. 3 is a left side view of an embodiment of the disclosure.
Figure 4:
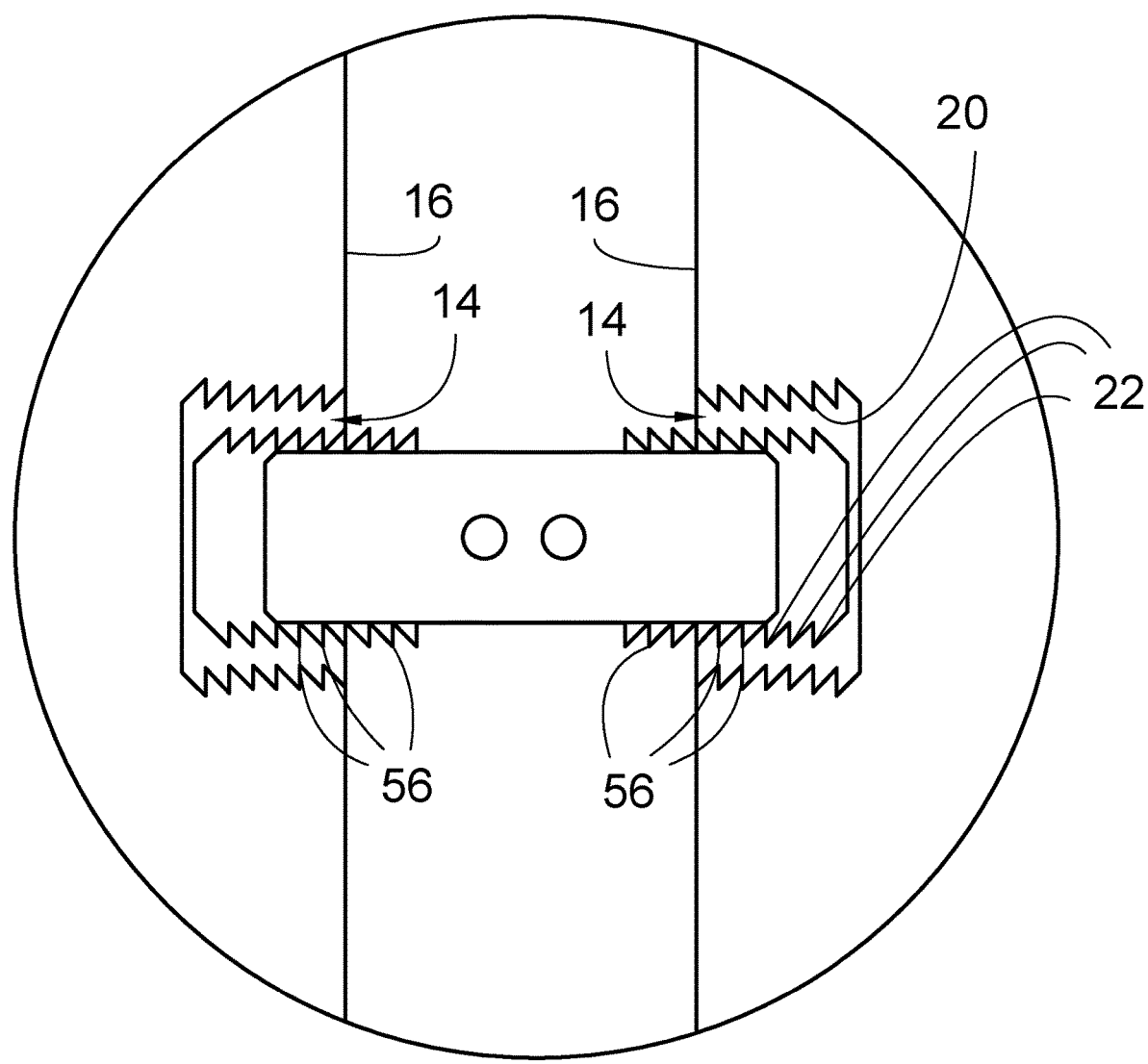
FIG. 4 is a cut-away in-use view of an embodiment of the disclosure.

With reference now to the drawings, and in particular to FIGS. 1 through 4 thereof, a new dowel device embodying the principles and concepts of an embodiment of the disclosure and generally designated by the reference numeral 10 will be described.

As best illustrated in FIGS. 1 through 4, the locking dowel assembly 10 generally comprises a pair of cups 12. Each of the cups 12 is inserted into a well 14 in a respective pair of objects 16 that are intended for joining together. The objects 16 may be walls of a cabinet that is being built, boards that are being joined together and any other wooden objects 16 that are joined together. Each of the cups 12 has an inside surface 18 and an outside surface 20. The outside surface 20 of each of the cups 12 is threaded to threadably engage a bounding surface of the well 14 in the respective object 16. Thus, each of the cups 12 can be screwed into the well 14 in the respective object 16. The inside surface 18 of each of the cups 12 is corrugated to define a series of valleys 22 on the inside surface 18 of each of the cups 12.

A pair of inserts 24 is provided and the inserts 24 are positioned against each other such that the pair of inserts 24 forms a cylinder. The cylinder is inserted into each of the cups 12 for joining the objects 16 together. Each of the inserts 24 has a first end 26, a second end 28, a first lateral edge 30, a second lateral edge 32 and an outer surface 34 extending between the first 26 and second 28 ends. The outer surface 34 of each of the inserts 24 has a first side 36 and a second side 38, and the second side 38 of each of the inserts 24 is concavely arcuate with respect to the first side 36.

The first side 36 of each of the inserts 24 has a first rasied portion 40 extending from the first end 26 toward the second end 28. The first side 36 of each of the inserts 24 has a second rasied portion 42 extending from the second end 28 toward the first end 26. Continuing, the first side 36 of each of the inserts 24 has a third rasied portion 44 extending from the first lateral edge 30 toward the second lateral edge 32. The first side 36 of each of the inserts 24 has a fourth rasied portion 46 extending from the second lateral edge 32 toward the first lateral edge 30. Each of the third 44 and fourth 46 rasied portions is positioned between the first 40 and second 42 rasied portions on each of the inserts 24.

Each of the inserts 24 has a pair of apertures 48 extending through the first side 36 and the second side 38. The pair of inserts 24 includes a first insert 50 and a second insert 52. The first side 36 of the first insert 50 abuts the first side 36 of the second insert 52 having each of the apertures 48 in the first insert 50 being aligned with a respective one of the apertures 48 in the second insert 52 when the first insert 50 is positioned on the second insert 52.

A retainer 54 is positioned between each of the inserts 24 and the retainer 54 has a plurality of teeth 56 thereon. The teeth 56 on the retainer 54 engage the cups 12 when the insert is inserted into each of the cups 12. In this way the inserts 24 are retained in the cups 12. The retainer 54 has a plurality of fingers 57 each extending away from a central panel 58. The fingers 57 are spaced apart from each other and are distributed around the central panel 58 such that the retainer 54 has an X-shape. Each of the fingers 57 has a distal end 60 with respect to the central panel 58 and an outwardly facing edge 62. The outwardly facing edge 62 on each of the fingers 57 has a plurality of indentations 64 thereon to define the plurality of teeth 56 on the outwardly facing edge 62 of each of the fingers 57.

The plurality of fingers 57 includes a first finger 66, a second finger 68, a third finger 70 and a fourth finger 72. The first rasied portion 40 on each of the first 50 and second 52 inserts is positioned between the first finger 66 and the second finger 68 when the retainer 54 is positioned between the inserts 24. The second rasied portion 42 is positioned between the third finger 70 and the fourth finger 72 when the retainer 54 is positioned between the inserts 24. The third rasied portion 44 is positioned between the first finger 66 and the third finger 70 when the retainer 54 is positioned between the inserts 24. The fourth rasied portion 46 is positioned between the second finger 68 and the fourth finger 72 when the retainer 54 is positioned between the inserts 24.

The teeth 56 on each of the fingers 57 extends outwardly beyond the first 30 and second 32 lateral edges of each of the inserts 24 when the retainer 54 is positioned between the inserts 24. Each of the teeth 56 has a forward edge 74 and a rearward edge 76. The forward edge 74 on each of the teeth 56 slopes toward the central panel 58. The rearward edge 76 of each of the teeth 56 is oriented perpendicular to the outwardly facing edge 62 of the fingers 57.

The distal end 60 of each of the first 66 and second 68 fingers is spaced from the first rasied portion 40 such that each of the first 66 and second 68 fingers is urgeable inwardly toward the first rasied portion 40 when the teeth 56 on the first 66 and second 68 finger engage a respective one the cups 12. In this way the forward edge 74 of the teeth 56 on the first 66 and second 68 finger slide along the corrugations in the respective cup 12. Thus, each of the first 66 and second 68 fingers can extend into the respective cup 12. Each of the first 66 and second 68 fingers are biased apart from each other. Thus, each of the teeth 56 on the first 66 and second 68 finger engages respective ones of the valleys 22 in the respective cup 12 when the first 66 and second 68 fingers are inserted into the respective cup 12. In this way the teeth 56 on the first 66 and second 68 fingers inhibits the first 66 and second 68 fingers from being removed from the respective cup 12.

The distal end 60 of each of the third 70 and fourth 72 fingers is spaced from the second rasied portion 42 such that each of the third 70 and fourth 72 fingers is urgeable inwardly toward the second rasied portion 42 when the teeth 56 on the third 70 and fourth 72 fingers engage a respective one of the cups 12. In this way the forward edge 74 of the teeth 56 on the third 70 and fourth 72 fingers slides along the corrugations in the respective cup 12. Thus, the third 70 and fourth 72 fingers can be extended into the respective cup 12. Each of the third 70 and fourth 72 fingers is biased apart from each other. Thus, each of the teeth 56 on each of the third 70 and fourth 72 fingers engages one of the valleys 22 the respective cup 12 when the third 70 and fourth 72 fingers are inserted into the respective cup 12. In this way the teeth 56 on the third 70 and fourth 72 fingers inhibits the third 70 and fourth 72 fingers from being removed from the respective cup 12.

A pair of pins 78 is provided and each of the pins 78 is extended through each of the inserts 24 and the retainer 54. In this way each of the inserts 24 are coupled together and the retainer 54 is coupled between the inserts 24. Each of the pins 78 is extended through a respective one of the apertures 48 in each of the first 50 and second 52 inserts.

In use, a well 14 is drilled into each of the objects 16 to be joined together and each of the cups 12 is screwed into the well 14 in a respective one of the objects 16. The retainer 54 is positioned between each of the inserts 24 and the pins 78 are extended through each of the inserts 24. The first end 26 of the pair of inserts 24 is inserted into a respective one of the cups 12 and the teeth 56 on each of the first 66 and second 68 fingers slides along the corrugation in the respective cup 12 while the first 66 and second 68 fingers are urged inwardly on the inserts 24. The second end 28 of the pair of inserts 24 is inserted into a respective one of the cups 12 and the teeth 56 on each of the third 70 and fourth 72 fingers slides along the corrugation in the respective cup 12 while the third 70 and fourth 72 fingers are urged inwardly on the inserts 24. The teeth 56 on each of the first 66, second 68, third 70 and fourth 72 fingers engage associated valleys 22 in the respective cup 12 when the inserts 24 are fully inserted into the cups 12. In this way the inserts 24 are secured between the objects 16 in the convention of a dowel with the added security of teeth 56 engaging the cups 12. Thus, the inserts 24 couple the objects 16 together without relying on glue or other conventional means of joining wooden objects together.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A locking dowel assembly being configured to form an invisible joint in a pair of objects, said assembly comprising:
   a pair of cups, each of said cups being inserted into a well in a respective pair of objects intended for joining together;
   a pair of inserts, said inserts being positioned against each other such that said pair of inserts forms a cylinder, said cylinder being inserted into each of said cups for joining the objects together and
   a retainer being positioned between each of said inserts, said retainer having a plurality of teeth thereon, said teeth engaging said cups when said insert is inserted into each of said cups thereby retaining said inserts in said cups;

wherein each of said cups has an inside surface and an outside surface, said outside surface of each of said cups being threaded to threadably engage a bounding surface of the well in the respective object thereby facilitating each of said cups to be screwed into the well in the respective object, said inside surface of each of said cups being corrugated to define a series of valleys on said inside surface of each of said cups;

wherein each of said inserts has a first end, a second end, a first lateral edge, a second lateral edge and an outer surface extending between said first and second ends, said outer surface of each of said inserts having a first side and a second side, said second side of each of said inserts being concavely arcuate with respect to said first side; and wherein each of said inserts has a pair of apertures extending through said first side and said second side.

2. The assembly according to claim 1, wherein said first side of each of said inserts has a first raised portion extending from said first end toward said second end.

3. The assembly according to claim 2, wherein said first side of each of said inserts having a second raised portion extending from said second end toward said first end.

4. The assembly according to claim 3, wherein said first side of each of said inserts has a third raised portion extending from said first lateral edge toward said second lateral edge.

5. The assembly according to claim 4, further comprising said first side of each of said inserts having a fourth raised portion extending from said second lateral edge toward said first lateral edge, each of said third and fourth raised portions being positioned between said first and second raised portions on each of said inserts.

6. The assembly according to claim 1, further comprising said pair of inserts includes a first insert and a second insert, said first side of said first insert abutting said first side of said second insert having each of said apertures in said first insert being aligned with a respective one of said apertures in said second insert when said first insert is positioned on said second insert.

7. A locking dowel assembly being configured to form an invisible joint in a pair of objects, said assembly comprising:
  a pair of cups, each of said cups being inserted into a well in a respective pair of objects intended for joining together;
  a pair of inserts, said inserts being positioned against each other such that said pair of inserts forms a cylinder, said cylinder being inserted into each of said cups for joining the objects together;
  a retainer being positioned between each of said inserts, said retainer having a plurality of teeth thereon, said teeth engaging said cups when said insert is inserted into each of said cups thereby retaining said inserts in said cups;
  wherein each of said cups has an inside surface and an outside surface, said outside surface of each of said cups being threaded to threadably engage a bounding surface of the well in the respective object thereby facilitating each of said cups to be screwed into the well in the respective object, said inside surface of each of said cups being corrugated to define a series of valleys on said inside surface of each of said cups;
  wherein each of said inserts has a first end, a second end, a first lateral edge, a second lateral edge and an outer surface extending between said first and second ends, said outer surface of each of said inserts having a first side and a second side, said second side of each of said inserts being concavely arcuate with respect to said first side;
  wherein said first side of each of said inserts has a first raised portion extending from said first end toward said second end;
  wherein said first side of each of said inserts having a second raised portion extending from said second end toward said first end;
  wherein said first side of each of said inserts has a third raised portion extending from said first lateral edge toward said second lateral edge;
  said first side of each of said inserts having a fourth raised portion extending from said second lateral edge toward said first lateral edge, each of said third and fourth raised portions being positioned between said first and second raised portions on each of said inserts; and
  wherein said retainer has a plurality of fingers each extending away from a central panel, said fingers being spaced apart from each other and being distributed around said panel such that said retainer has an X-shape, each of said fingers having a distal end with respect to said central panel and an outwardly facing edge, said outwardly facing edge on each of said fingers having a plurality of indentations thereon to define said plurality of teeth on said outwardly facing edge of each of said fingers.

8. The assembly according to claim 7, wherein:
  said plurality of fingers includes a first finger, a second finger, a third finger and a fourth finger;
  said first raised portion on each of first and second inserts being positioned between said first finger and said second finger when said retainer is positioned between said inserts;
  said second raised portion is positioned between said third finger and said fourth finger when said retainer is positioned between said inserts;
  said third raised portion is positioned between said first finger and said third finger when said retainer is positioned between said inserts; and
  said fourth raised portion is positioned between said second finger and said fourth finger when said retainer is positioned between said inserts.

9. The assembly according to claim 8, wherein said teeth on each of said fingers extends outwardly beyond each of said inserts when said retainer is positioned between said inserts.

10. The assembly according to claim 9, wherein each of said teeth has a forward edge and a rearward edge, said forward edge on each of said teeth sloping toward said central panel, said rearward edge being oriented perpendicular to said outwardly facing edge of said fingers.

11. The assembly according to claim 10, further comprising said distal end of each of said first and second fingers being spaced from said first raised portion such that each of said first and second fingers is urgeable inwardly toward said first raised portion when said teeth on said first and second fingers engage a respective one said cups thereby facilitating said first and second fingers to extend into said respective cup.

12. The assembly according to claim 11, wherein each of said teeth on said first and second fingers engages respective ones of said valleys in said respective cup when said first and second fingers are inserted into said respective cup thereby inhibiting said first and second fingers from being removed from said respective cup.

13. The assembly according to claim 10, wherein said distal end of each of said third and fourth fingers being spaced from said second raised portion such that each of said third and fourth fingers is urgeable inwardly toward said second raised portion when said teeth on said third and fourth fingers engage a respective one of said cups thereby facilitating said third and fourth fingers to extend into said respective cup.

14. The assembly according to claim 13, wherein each of said teeth on each of said third and fourth fingers engages one of said valleys in said respective cup when said third and fourth fingers are inserted into said respective cup thereby inhibiting said third and fourth fingers from being removed from said respective cup.

15. A locking dowel assembly being configured to form an invisible joint in a pair of objects, said assembly comprising:
  a pair of cups, each of said cups being inserted into a well in a respective pair of objects intended for joining together, each of said cups having an inside surface and an outside surface, said outside surface of each of said cups being threaded to threadably engage a bounding surface of the well in the respective object thereby facilitating each of said cups to be screwed into the well in the respective object, said inside surface of each of said cups being corrugated to define a series of valleys on said inside surface of each of said cups;
  a pair of inserts, said inserts being positioned against each other such that said pair of inserts forms a cylinder, said cylinder being inserted into each of said cups for joining the objects together, each of said inserts having a first end, a second end, a first lateral edge, a second lateral edge and an outer surface extending between said first and second ends, said outer surface of each of said inserts having a first side and a second side, said second side of each of said inserts being concavely arcuate with respect to said first side, said first side of each of said inserts having a first raised portion extending from said first end toward said second end, said first side of each of said inserts having a second raised portion extending from said second end toward said first end, said first side of each of said inserts having a third raised portion extending from said first lateral edge toward said second lateral edge, said first side of each of said inserts having a fourth raised portion extending from said second lateral edge toward said first lateral edge, each of said third and fourth raised portions being positioned between said first and second raised portions on each of said inserts, each of said inserts having a pair of apertures extending through said first side and said second side, said pair of inserts including a first insert and a second insert, said first side of said first insert abutting said first side of said second insert having each of said apertures in said first insert being aligned with a respective one of said apertures in said second insert when said first insert is positioned on said second insert;
  a retainer being positioned between each of said inserts, said retainer having a plurality of teeth thereon, said teeth engaging said cups when said insert is inserted into each of said cups thereby retaining said inserts in said cups, said retainer having a plurality of fingers each extending away from a central panel, said fingers being spaced apart from each other and being distributed around said panel such that said retainer has an X-shape, each of said fingers having a distal end with respect to said central panel and an outwardly facing edge, said outwardly facing edge on each of said fingers having a plurality of indentations thereon to define the plurality of teeth on said outwardly facing edge of each of said fingers, said plurality of fingers including a first finger, a second finger, a third finger and a fourth finger, said first raised portion on each of said first and second inserts being positioned between said first finger and said second finger when said retainer is positioned between said inserts, said second raised portion being positioned between said third finger and said fourth finger when said retainer is positioned between said inserts, said third raised portion being positioned between said first finger and said third finger when said retainer is positioned between said inserts, said fourth raised portion being positioned between said second finger and said fourth finger when said retainer is positioned between said inserts, said teeth on each of said fingers extending outwardly beyond each of said inserts when said retainer is positioned between said inserts, each of said teeth having a forward edge and a rearward edge, said forward edge on each of said teeth sloping toward said central panel, said rearward edge being oriented perpendicular to said outwardly facing edge of said fingers, said distal end of each of said first and second fingers being spaced from said first raised portion such that each of said first and second fingers is urgeable inwardly toward said first raised portion when said teeth on said first and second fingers engage a respective one of said cups thereby facilitating said first and second fingers to extend into said respective cup, each of said teeth on said first and second fingers engaging respective ones of said valleys in said respective cup when said first and second fingers are inserted into said respective cup thereby inhibiting said first and second fingers from being removed from said respective cup, said distal end of each of said third and fourth fingers being spaced from said second raised portion such that each of said third and fourth fingers is urgeable inwardly toward said second raised portion when said teeth on said third and fourth fingers engage a respective one of said cups thereby facilitating said third and fourth fingers to extend into said respective cup, each of said teeth on each of said third and fourth fingers engaging one of said valleys, said respective cup when said third and fourth fingers are inserted into said respective cup thereby inhibiting said third and fourth fingers from being removed from said respective cup; and
  a pair of pins, each of said pins being extended through each of said inserts and said retainer thereby coupling each of said inserts to said retainer, each of said pins extending through a respective one of said apertures.

* * * * *